(12) United States Patent
Grice

(10) Patent No.: US 11,134,738 B2
(45) Date of Patent: Oct. 5, 2021

(54) HELMET WITH EXTERNAL FLEXIBLE CAGE

(71) Applicant: Turtle Shell Protective Systems LLC, Indianapolis, IN (US)

(72) Inventor: Darin D. Grice, Indianapolis, IN (US)

(73) Assignee: Turtle Shell Protective Systems LLC, Indianapolis, IN (US)

( * ) Notice: Subject to any disclaimer, the term of this patent is extended or adjusted under 35 U.S.C. 154(b) by 122 days.

(21) Appl. No.: 16/169,450

(22) Filed: Oct. 24, 2018

(65) Prior Publication Data

US 2019/0116907 A1    Apr. 25, 2019

Related U.S. Application Data

(60) Provisional application No. 62/576,768, filed on Oct. 25, 2017.

(51) Int. Cl.
| | | |
|---|---|---|
| *A42B 3/04* | (2006.01) |
| *A42B 3/06* | (2006.01) |
| *F16F 1/373* | (2006.01) |
| *F16F 1/371* | (2006.01) |
| *A42B 3/12* | (2006.01) |

(52) U.S. Cl.
CPC ............... *A42B 3/06* (2013.01); *A42B 3/069* (2013.01); *A42B 3/125* (2013.01); *F16F 1/371* (2013.01); *F16F 1/373* (2013.01); *F16F 2230/08* (2013.01)

(58) Field of Classification Search
CPC .. A42B 3/06; A42B 3/12; A42B 3/125; A42B 3/04

USPC ............... 2/410–414; 248/636; 267/158–160
See application file for complete search history.

(56) References Cited

U.S. PATENT DOCUMENTS

| | | | | |
|---|---|---|---|---|
| 2,594,665 | A | * | 4/1952 | Lockwood ............ F16F 15/073 267/28 |
| 2,759,186 | A | | 8/1956 | Dye |
| 3,039,109 | A | | 6/1962 | Simpson |
| 3,417,950 | A | * | 12/1968 | Johnson .................... F16F 3/12 248/570 |
| 3,609,764 | A | | 10/1971 | Morgan |
| 3,872,511 | A | | 3/1975 | Nichols |
| 4,223,409 | A | | 9/1980 | Lee |
| 4,239,106 | A | | 12/1980 | Aileo |
| 4,290,149 | A | | 9/1981 | Aileo |
| 4,324,005 | A | | 4/1982 | Wilis |
| 4,564,959 | A | | 1/1986 | Zahn |
| 4,665,569 | A | | 5/1987 | Santini |
| 4,766,614 | A | | 8/1988 | Cantwell et al. |
| 5,149,066 | A | * | 9/1992 | Snaith ...................... F16F 7/14 248/636 |
| 5,204,998 | A | | 4/1993 | Liu |
| 5,561,866 | A | | 10/1996 | Ross |

(Continued)

FOREIGN PATENT DOCUMENTS

CA    2 669 890    12/2010

*Primary Examiner* — Christopher P Schwartz
(74) *Attorney, Agent, or Firm* — Woodard, Emhardt, Henry, Reeves & Wagner, LLP

(57) ABSTRACT

A flex cell for absorbing energy from an applied force includes a panel attached to a flex cage. The flex cage is made from a resilient material that allows deformation of the flex cage when a force is applied to the flex cell. The flex cell is attachable to a support surface. In some instances, the flex cell is detached from the support surface when sufficient force is applied to the flex cell.

28 Claims, 13 Drawing Sheets

(56) References Cited

U.S. PATENT DOCUMENTS

| | | | |
|---|---|---|---|
| 5,632,473 A * | 5/1997 | Dias Magalhaes Queiroz .......... A47C 23/002 267/103 | |
| 5,833,796 A * | 11/1998 | Matich ................... A42C 2/00 156/285 | |
| 5,950,244 A | 9/1999 | Fournier et al. | |
| 5,956,777 A | 9/1999 | Popovich | |
| 6,260,212 B1 | 7/2001 | Orotelli et al. | |
| 6,314,586 B1 | 11/2001 | Duguid | |
| 6,378,140 B1 | 4/2002 | Abraham et al. | |
| 6,389,607 B1 | 5/2002 | Wood | |
| 6,434,755 B1 | 8/2002 | Halstead et al. | |
| 6,460,837 B1 * | 10/2002 | Ahern ...................... F16F 7/00 267/148 | |
| 6,493,881 B1 | 12/2002 | Picotte | |
| 6,969,548 B1 | 11/2005 | Goldfine | |
| 6,986,168 B2 | 1/2006 | Abelman et al. | |
| 7,103,923 B2 | 9/2006 | Picotte | |
| 7,159,249 B2 | 1/2007 | Dennis et al. | |
| 7,254,843 B2 | 8/2007 | Talluri | |
| 7,316,036 B2 | 1/2008 | Rudolf et al. | |
| 7,478,438 B2 | 1/2009 | Lolis | |
| 7,673,351 B2 | 3/2010 | Copeland et al. | |
| 7,765,622 B2 | 8/2010 | Wiles | |
| 7,774,866 B2 | 8/2010 | Ferrara | |
| 7,895,681 B2 | 3/2011 | Ferrara | |
| 7,950,073 B2 | 5/2011 | Ferrara | |
| 8,001,622 B1 | 8/2011 | Culley et al. | |
| 8,069,498 B2 | 12/2011 | Maddux et al. | |
| 8,082,599 B2 | 12/2011 | Sajic | |
| 8,166,574 B2 | 5/2012 | Hassler | |
| 8,566,968 B2 | 10/2013 | Marzec et al. | |
| 8,726,424 B2 | 5/2014 | Thomas et al. | |
| 8,814,150 B2 | 8/2014 | Ferrara et al. | |
| 8,844,066 B1 | 9/2014 | Whitcomb | |
| 8,955,169 B2 | 1/2015 | Weber et al. | |
| 9,113,672 B2 | 8/2015 | Witcher | |
| 9,316,282 B1 * | 4/2016 | Harris ................... A43B 13/183 | |
| 9,332,800 B2 | 5/2016 | Brown | |
| 9,642,410 B2 | 5/2017 | Grice | |
| 2007/0190293 A1 | 8/2007 | Ferrara | |
| 2008/0256686 A1 | 10/2008 | Ferrara | |
| 2010/0000009 A1 | 1/2010 | Morgan | |
| 2010/0186150 A1 | 7/2010 | Ferrara | |
| 2011/0203024 A1 | 8/2011 | Morgan | |
| 2011/0296594 A1 | 12/2011 | Thomas et al. | |
| 2012/0124718 A1 | 5/2012 | Picotte | |
| 2013/0014313 A1 | 1/2013 | Erb et al. | |
| 2013/0174331 A1 | 7/2013 | Witcher | |
| 2014/0068841 A1 * | 3/2014 | Brown ................... A42B 3/122 2/413 | |
| 2014/0123371 A1 | 5/2014 | Witcher | |
| 2014/0196198 A1 * | 7/2014 | Cohen ..................... F41H 1/04 2/414 | |
| 2014/0208486 A1 * | 7/2014 | Krueger ................ A42B 3/064 2/414 | |
| 2014/0215694 A1 * | 8/2014 | Grice ..................... A42B 3/06 2/411 | |
| 2016/0157545 A1 * | 6/2016 | Bowman ................ A42B 3/067 2/416 | |

\* cited by examiner

HELMET WITH EXTERNAL FLEXIBLE CAGE

CROSS-REFERENCE TO RELATED APPLICATION

This application claims the benefit of U.S. Provisional Application No. 62/576,768 filed Oct. 25, 2017, which is hereby incorporated by reference.

BACKGROUND

Collisions between two objects can result in a transfer of energy between the two objects. This transfer of energy is capable of causing damage to the objects involved in the collision, and, when a person is involved, can cause bodily harm. Helmets have been used for centuries to protect the head from injury that would otherwise result from an impact. The typical helmet has a rigid outer shell and internal padding which spreads and cushions blows to the head of the wearer. A drawback to those helmets is that the helmet does little to dissipate the shock wave before the shockwave reaches the padding and internal support structures next to the wearer's head. Despite the presence of internal padding, the force may be nonetheless sufficient to cause a concussion, a contusion, or even a fractured skull.

The same problem exists with barriers, such as traffic safety barriers that prevent vehicles from entering an unwanted area or an area that may cause additional danger to either the driver or the workers and pedestrians. Although these barriers stop the movement of a vehicle, much of the energy from the impact of the collision with the barrier is transferred to the driver and any passengers of the vehicle.

Thus, there is a need for improvement in this field.

SUMMARY

An energy absorption system includes a flex cell coupled to a support surface, such as the shell of a helmet. The flex cell includes a panel and a flex cage attached to the panel. The flex cage is made from a resilient material that allows deformation of the flex cage when a force is applied to the flex cell. The deformation of the flex cage absorbs at least a portion of the energy from the force applied to flex cell so that portion of the energy is not transferred to the support surface.

In some instances, the flex cage is dome shaped and includes a panel rib locus and a support rib locus. The flex cage may also include deformable ribs. One end of each of the ribs is connected to the panel rib locus and the other end of each of the ribs is connected to the support rib locus. A rib gap is defined between adjacent ribs. In some embodiments, each of the ribs has the same length and width; however, in other embodiments, the length and/or the width of the ribs may be varied.

Multiple flex cells can be coupled to the same support surface. The flex cage of one flex cell is independent of the flex cages of adjacent flex cells so that each flex cell is capable of moving, flexing, and/or deforming independently of the other flex cells coupled to the support surface. In some embodiments, the flex cells are attached to the support surface so that the flex cells are separable from the support surface when a force exceeding a separation threshold is applied to the flex cell.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
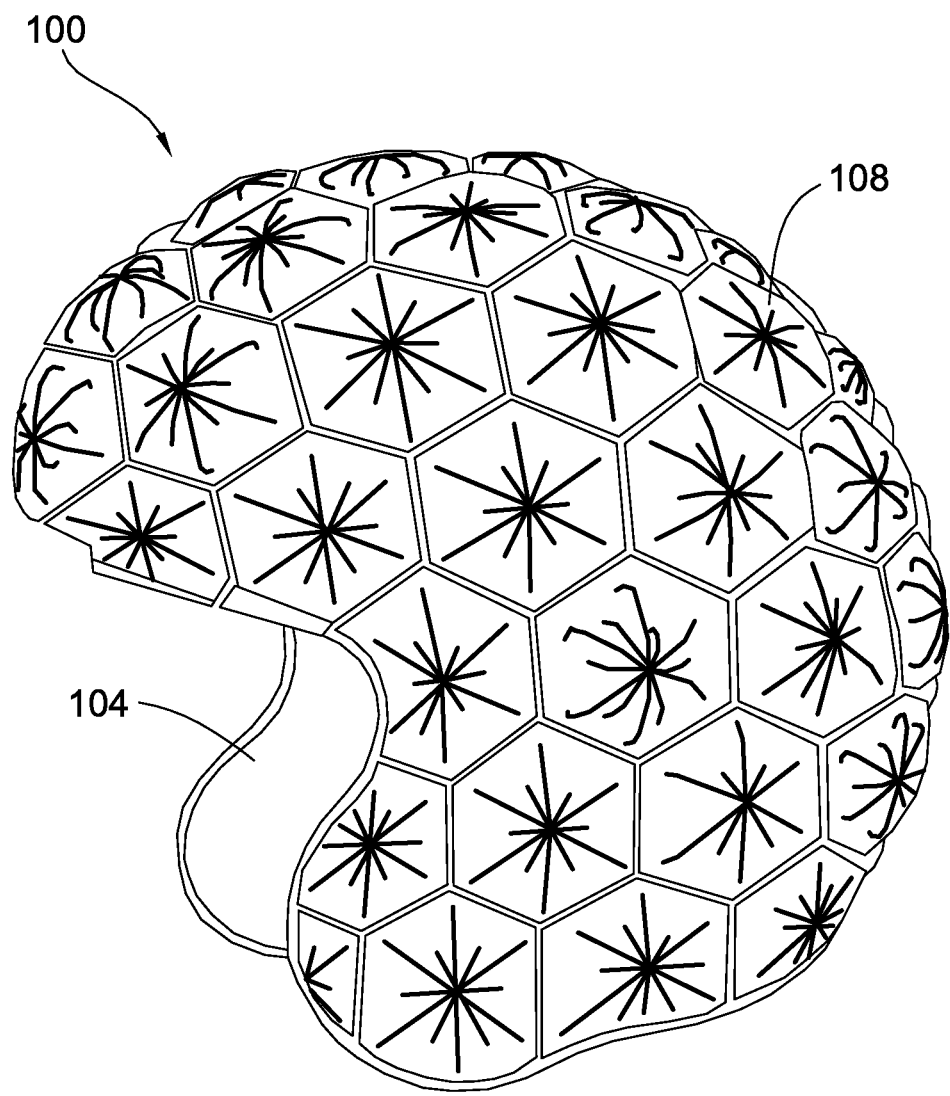
FIG. 1 is a perspective view of a helmet including flex cells attached to a shell of the helmet.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates a helmet 100 according to one embodiment of the invention. The helmet 100 includes a support surface 104, such as the shell of the helmet. Flex cells 108 are attached to an outer surface of the support surface 104. The flex cells 108 are attached to an outer surface of the support surface 104 and are designed to compress and/or deform upon the application of force to the support surface 104 to absorb at least a portion of the force before the force is applied on the object which the helmet 100 is protecting. Each of the flex cells 108 on the support surface 104 is independent of the other flex cells 108 so that each flex cell 108 is capable of absorbing a force and flexibly deforming in the direction of the force to efficiently absorb the energy supplied by the force. It should be understood, that the term "force" is used to describe any type of force that may be applied to the support surface 104. For example, a force may be a compressive force or a shear force. A force may also be a combination of different types of forces, such as force applied to a support surface 104 that includes compressive force and shear force.

In the embodiment shown, the flex cells 108 are distributed across the entirety of the support surface 104; however, in other embodiments, the flex cells 108 may cover only a portion of the support surface 104. Additionally, in the embodiment shown in FIG. 1, the flex cells 108 are hexagonal, but in other embodiments the flex cells may be any desired shape. For example, the flex cells 108 may be pentagonal, triangular, rectangular, or any other suitable shape. In some instances, the shape of the flex cells 108 is chosen so the flex cells 108 may be nested to fully cover the entire support surface 104 without having gaps between the flex cells 108 where the support surface 104 would be unprotected. There may also be a minimal gap between flex cells to dissipate rotational force through an impact sequence.

Figure 2:
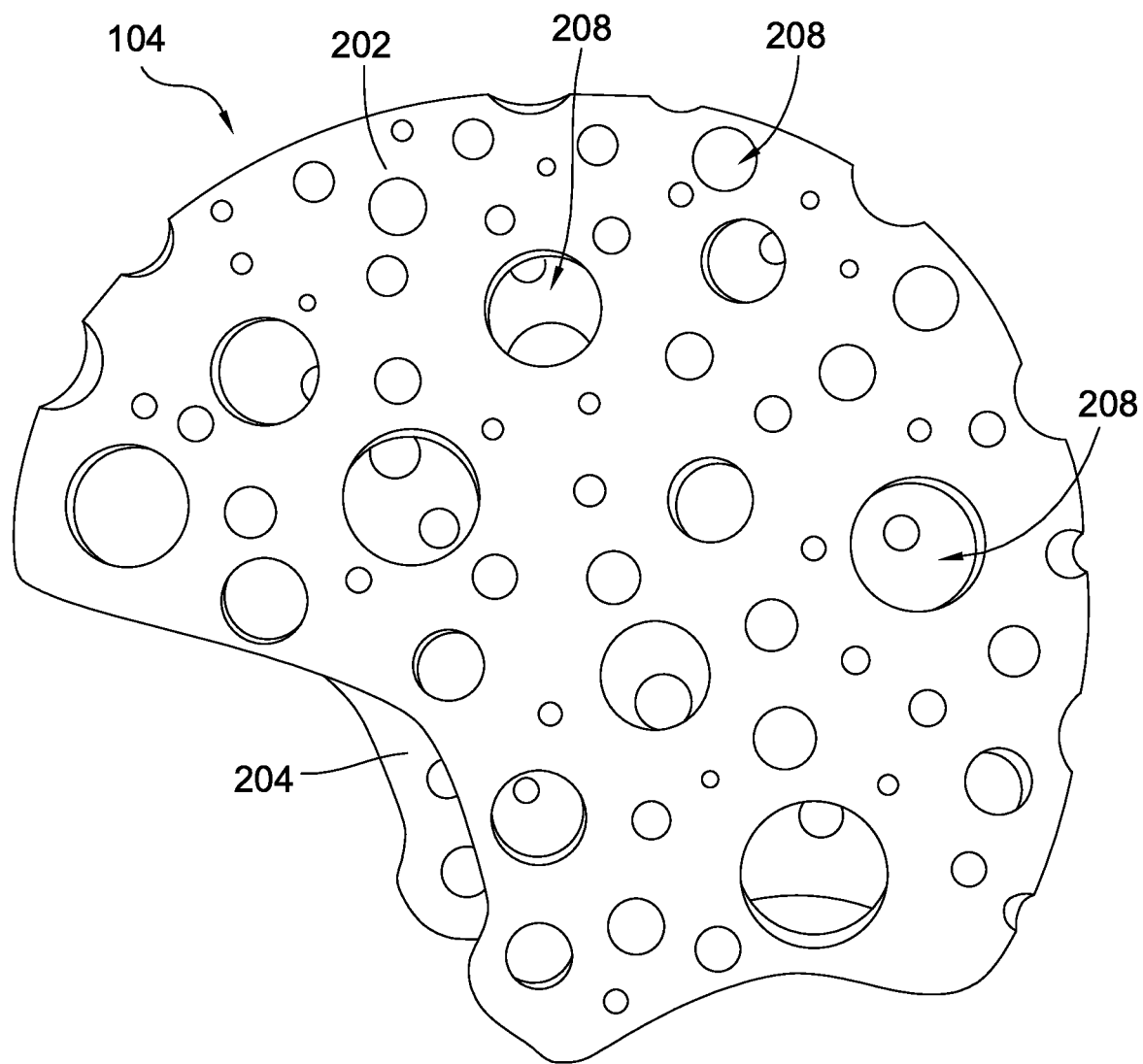
FIG. 2 is a perspective view of the shell of the helmet of FIG. 1.

An embodiment of the support surface 104 is shown in FIG. 2. The support surface 104 includes an outer surface 202 and an inner surface 204 and may include one or more shell openings 208 defined through support surface 104. The shell openings 208 reduce the weight of the support surface 104 and also improve ventilation by allowing air flow through the support surface 104. In some embodiments, the support surface 104 may include shell openings 208 that are used to attach panel buttons 22 to the outer surface of shell 21. The support surface 104 is typically formed from a strong, rigid material, such as carbon fiber or polycarbonate, that is resistant to deformation and breaking upon the application of force. In other embodiments, the support surface 104 may be a non-rigid material that is flexible and/or allows deformation upon the application of force.

Although the support surface 104 is shown with circular shell openings 208, in other embodiments, the support surface 104 may include features of other sizes and/or shapes that allow for ventilation and reduction of weight. As an example, instead of the circular shell openings 208, the support surface 104 may include cross bars with linear shell openings 208 defined between the cross bars. In another example, the support surface 104 may include a mesh design with shell openings 208 defined between the solid portions of the mesh.

Figure 3:
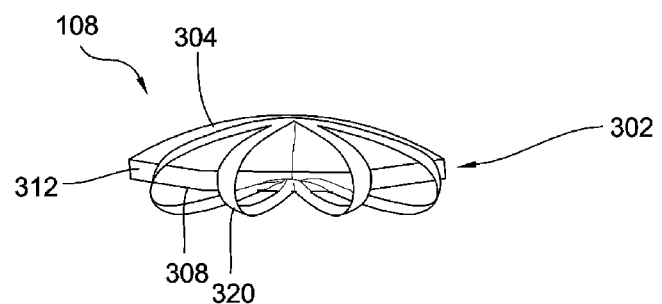
FIG. 3 is a front view of a flex cell of FIG. 1.

A flex cell 108 is shown in FIG. 3. The flex cell 108 includes a panel 302 that has a distal face 304 and a proximal face 308. A lateral edge 312 is defined between the distal face 304 and the proximal face 308. The panel 302 may be made from a material that gives the panel a hard surface, such as poly-carbonate, carbon fiber, Kevlar, Teflon, or any other suitable material. A flex cage 320 is attached to and extends from the panel 302. In the embodiment shown, the distal face 304 of the flex cell 108 has a convex shape in the form of a cone or a dome. The convex shape of the distal face 304 creates multiple impact points when a force is applied to the helmet 100, allowing the force to be spread over multiple flex cells 108.

The distal face 304 has a convex shape. This convex shape creates a misdirected flow of energy at impact. The flex cell 108 flexes laterally as well as inwardly, which breaks up straight line energy before it reaches the support surface 104, or the head and neck of a person wearing the helmet 100. This creates a reduction in acceleration, before the potentially damaging impact, which reduces force. When significant force is applied to a flex cell 108, the flex cell 108 flexes laterally and impacts the adjacent flex cell(s) 108, which transfers and disperses kinetic energy originated by initial impact. If the impact is substantial, then multiple flex cells 108 will flex, impact, transfer, and disperse the energy from the impact.

Although the distal face 304 of the flex cell 108 is shown as being convex, in other embodiments, the distal face 304 may be concave or flat. The distal face 304 may be a continuous smooth surface or may include a number of individual planar surfaces or facets. The panel 302 may be made from a high strength material such as carbon fiber or polycarbonate. In some examples, the panel 302 is manufactured using three-dimensional printing.

In some embodiments, the panel 302 is overlaid on top of the flex cage 320, as shown in FIG. 3. In these embodiments, a portion of the flex cage 320 extends from panel 302 so that a part of the flex cage 320 is exterior to the panel 302. A portion of the flex cage 320 may be implanted into the panel 302 during manufacturing so that the panel 302 is integral to the flex cage 320; however, a portion of the flex cage 320 remains exterior to the panel 302 to allowing flexibility of the flex cage 320 so that each flex cell 108 may move and deform independently of other adjacent flex cells 108. In other embodiments, flex cage 320 may be connected to the panel 302 using an adhesive or another attachment mechanism such as a screw or a fastener. As an alternative, in some embodiments, the panel 302 may completely surround the flex cage 320, so that the entirety of the flex cage 320 is contained within the interior of the panel 302.

Figure 4:
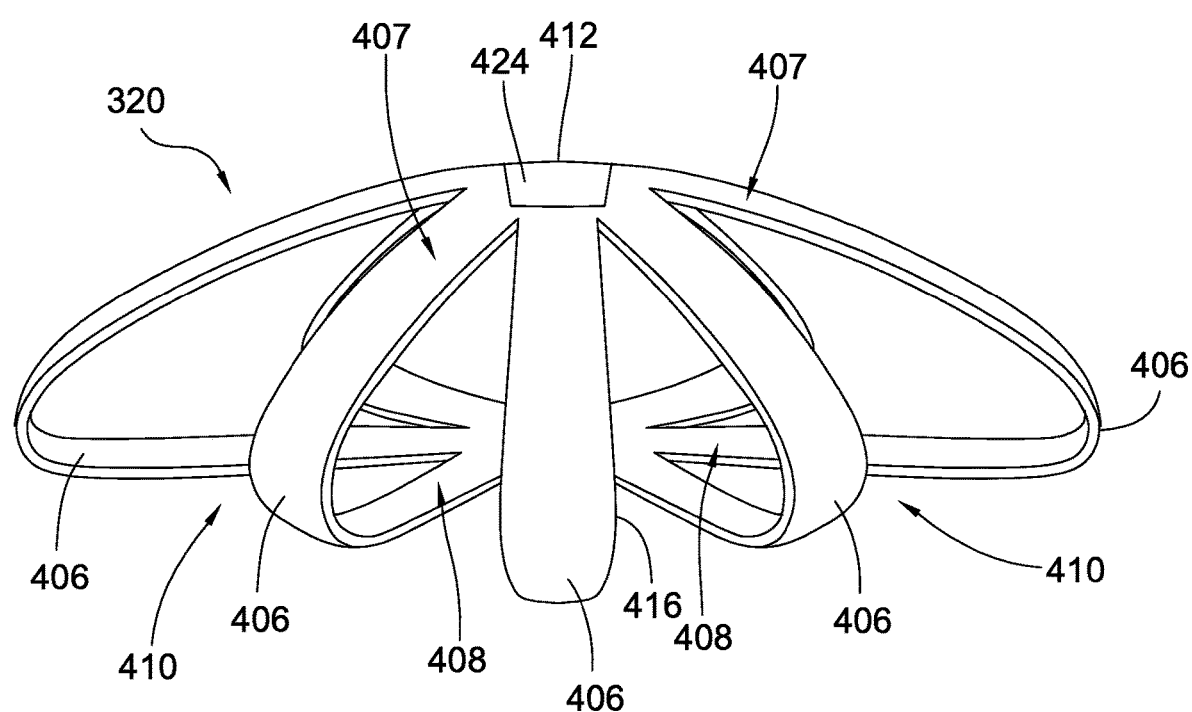
FIG. 4 is a front view of a flex cage of the flex cell of FIG. 3.

As shown in FIG. 4, the flex cage 320 includes ribs 406 separated by a rib gap 410 that is defined between adjacent ribs 406. One end of each rib 406 extends from a panel rib locus 412 at the portion of the flex cage 320 that connects to a panel 302. Each rib 406 is bent in a loop so that the opposite end of the rib 406 connects at a support rib locus 416 at the portion of the flex cage 320 that is connected to the outer surface 202 of the support surface 104. The bent, looped shape of the ribs 406 gives flex cage 320 a conical or domed shape that corresponds to the shape of the panel 302. However, in other embodiments, it is not required that the flex cage 320 have a domed shape so that the flex cell 108 is convex with respect to the support surface 104. The flex cell 108 may also be flat or concave with respect to the support surface 104.

The ribs 406 are made from a resilient material that allows the ribs 406 to deform upon the application of force and return to their original position when the force is removed. The separation created by the rib gap 410 between adjacent ribs 406 allows compression of the flex cell 108 along different planes depending on the direction from which the force is applied.

In some embodiments, the flex cell 108 includes a sensor 424 that is capable of measuring various properties of the flex cell 108. In the embodiment shown in FIG. 4, the sensor 424 is positioned on the flex cage 320 at the panel rib locus 412; however, in other embodiments, the sensor 424 may be located at other positions on the flex cage 320 or on or within the panel 302. The sensor gathers information regarding properties such as acceleration and force applied to flex cell 108 and provides feedback to a user for monitoring or for further analysis. This information may be used for evaluation of a subject using the flex cell 108 and for future improvement of the function of the flex cell 108. Although acceleration and force are given as representative properties to be measured by the sensor, the sensor may have the capability to track and record other measurable properties as desired.

Figure 5:
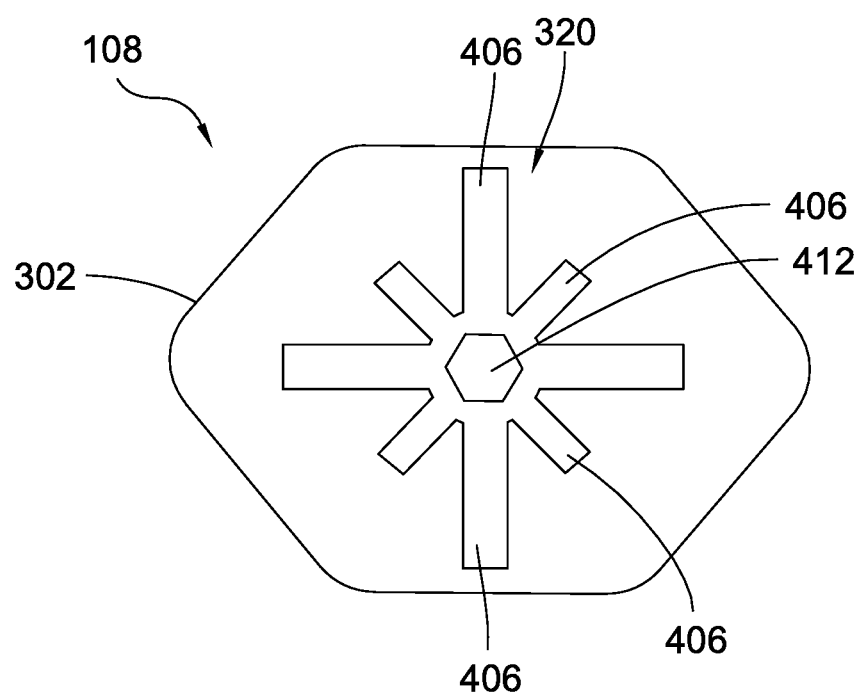
FIG. 5 is a top view of the flex cell of FIG. 3.

As illustrated in the top view of flex cage 320 shown in FIG. 5, the length and width of the ribs 406 in the same flex cage 320 may be varied. In the embodiment of the flex cage 320 that is shown, the ribs 406 alternate between large ribs that have a longer length and greater width and small ribs that have a shorter length and a smaller width than the large ribs. This arrangement of varying sizes of the ribs 406 allows a gradual increase in resistance provided by the flex cage 320 during impact of a force. The varying sizes also promote lateral movement of the flex cage 320 to create a sequence of several impacts that dissipate energy and reduce torque caused by the applied force.

Additionally, the flex cage 320 shown in FIGS. 4 and 5 includes eight ribs 406; however, it should be understood that other embodiments may have more than eight ribs or may have fewer than eight ribs. As an example, some flex cages 320 may include only four ribs. In another example the flex cage 320 may include sixteen ribs. In some embodiments, increasing the number of ribs in the flex cage 320 may increase the amount of force needed to deform the flex cell 108. Conversely, decreasing the number of ribs in the flex cage 230 may decrease the amount of force needed to deform the flex cell 108. This allows customization of the flex cells 108 to provide a desired amount of force absorption and deformation based on the function for which the helmet 100 is to be used.

When a force is applied to the helmet 100, the force first contacts the flex cells 108 that cover the support surface 104 of the helmet 100. As the force is applied, energy from the force is transferred to the flex cage 320 of the flex cell 108 to compress or deform of the ribs 406 of the flex cage. This energy is absorbed by the flex cage 320 before the energy can be applied to the support surface 104 of the helmet. Therefore, the force that is transferred to the support surface 104, and ultimately the object protected by the helmet 100, is greatly reduced due to the use of the energy to deform the flex cages 320. After compression, the ribs 406 of the flex cage 320 may recover to the original position of the ribs 406 before compression. In some embodiments, the ribs 406 may be more permanently deformed so that the flex cage 320 can no longer be used to absorb force. When this occurs, the flex cage 320 may be removed from the support surface 104 and a new flex cage 320 may be added to the support surface 104 to replace the damaged flex cage 320.

In one embodiment, the flex cell 108 is made by attaching a plurality of curved ribs 406 made from a resilient material to form a flex cage 320. Each rib 406 includes a panel end 407 and a support end 408. The panel end 407 of each rib 406 is connected to the other ribs at the panel rib locus 412 and the support end 408 of each rib 406 is connected to the other ribs 406 at the support rib locus 416. The panel 302 is then attached to the flex cage 320 to form the flex cell 108. The panel 302 is positioned with respect to the flex cage 320 so that the panel 302 covers at least a portion of the ribs 406. In some cases, a portion of each of the ribs 406 may be positioned within the interior of the panel 302 while a portion of each of the ribs 406 is also exterior of the panel 302. The flex cell 108 is then connected to a support surface 104, such as the shell of a helmet, so that the panel 302 of the flex cell 108 overlays at least a portion of the support surface 104 so that a force applied to the support surface 104 must first be applied to the panel 302 of the flex cell.

In other embodiments, the order of assembling the flex cell 108 may be modified. For example, the panel 302 can be attached to the panel ends 407 of the ribs 406 and then the support ends 408 of the ribs 406 may be attached at the support rib locus 416. In another example, the flex cage 320 may be attached to a support surface 104, and then the panel 302 may be attached to flex cage 320.

The flex cells 108 may be attached to the support surface 104 by any suitable method to secure a flex cell 108 to the support surface 104. In one example, shown in FIG. 6, the flex cell 108 includes a flex cell attachment fitting 604 at the support rib locus 416 that is configured to mate with a support surface attachment fitting 608. In the embodiment shown, the flex cell attachment fitting 604 is a female fitting and the support surface attachment fitting 608 is a male fitting that fits within the flex cell attachment fitting 604 to attach the flex cell 108 to the support surface 104. In other embodiments, the flex cell attachment fitting 604 may be a male fitting and the support surface attachment fitting 608 may be a female fitting.

Figure 6:
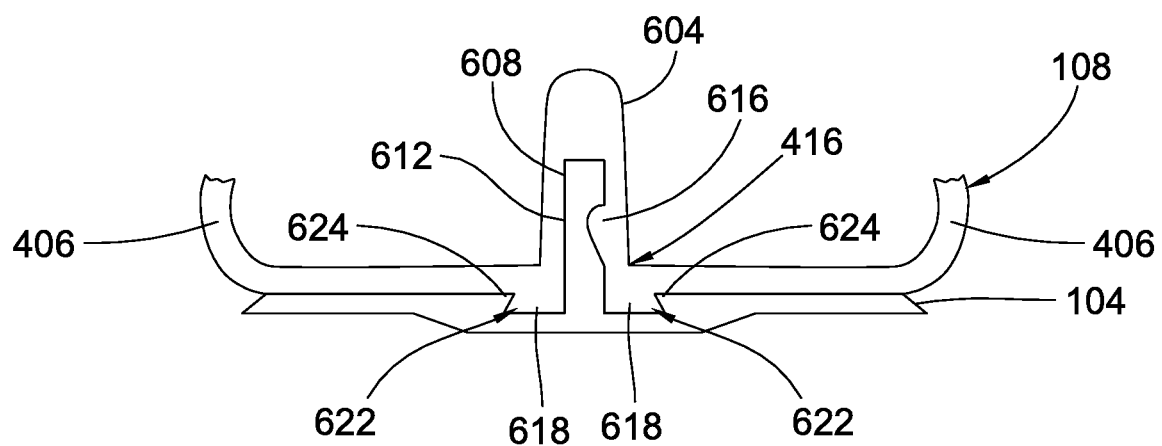
FIG. 6 is a cross sectional view of an embodiment of a flex cell attached to a support surface.

In FIG. 6, the support surface attachment fitting 608 includes a notched recess 612 that is designed to receive a notch 616 on the flex cell attachment fitting 604. The flex cell attachment fitting 604 also includes legs 618 that extend from the ribs 406. Each of the legs 618 is sized to fit into an undercut portion 622 of the support surface 104. The support surface 104 includes an overhang 624 that extends over a portion of the undercut portion 622 to reduce the clearance provided for removal of the leg 618 from the undercut portion 622. In some embodiments, epoxy may be included between the flex cell 108 and the support surface 104 to act as an adhesive to further strengthen the attachment between the flex cell 108 and the support surface 104. In other embodiments, no adhesive is included between the flex cell 108 and the support surface 104, allowing the flex cell 108 to more easily break away from the support surface 104 upon the application of force. The separation of the flex cell 108 from the support surface 104 can provide further dissipation of energy from the applied force, reducing the amount of energy transferred to the object protected by the helmet 100.

The fitting of the notch 616 into the notched recess 612 and the fitting of the legs 618 into the undercut portions 622 assist to keep the flex cells 108 attached to the support surface 104. A sufficient amount of force must be applied to the flex cell 108 to remove the legs 618 from undercut portion 622 and to also remove the notch 616 from the notched recess 612. The dimensions of the notch 616 and the notched recess 612 as well as the dimensions of the legs 618 and the undercut portions 622 may be designed to require either more or less force to remove the flex cell 108 from the support surface 104 as desired. In some embodiments, the flex cell attachment fitting 604 and the support surface attachment fitting 608 may be designed to require less force for removal, allowing for the flex cell 108 to easily break away from the support surface 104. In other embodiments, the flex cell attachment fitting 604 and the support surface attachment fitting 608 may be designed to require more force for removal, making it difficult for the flex cell 108 to break away from the support surface 104.

Figure 7:
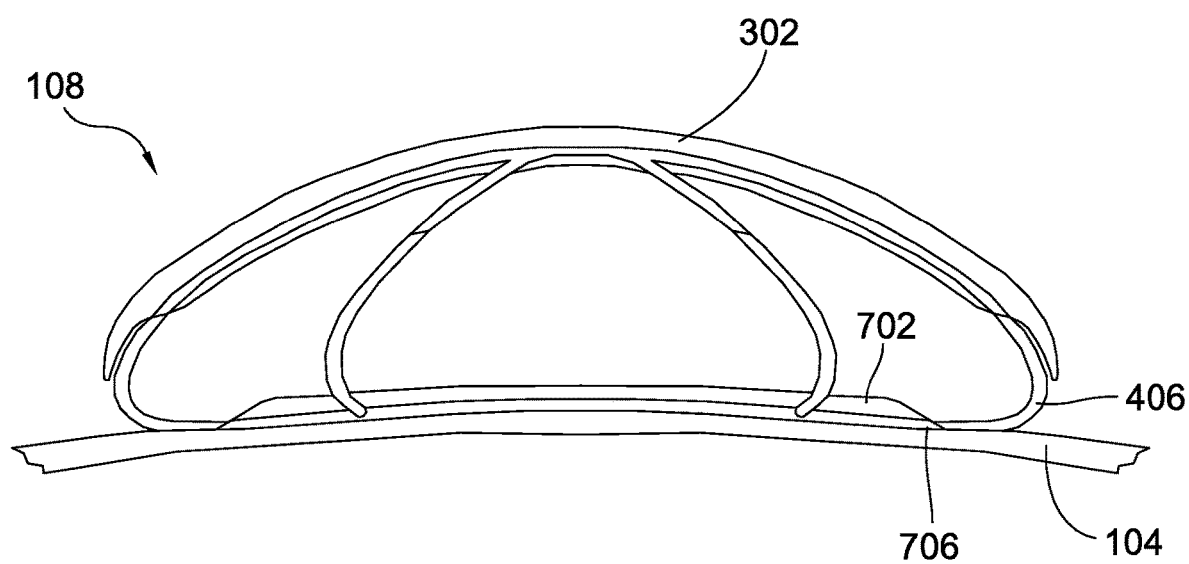
FIG. 7 is a cross sectional view of an embodiment of a flex cell attached to a support surface.

An alternative method of attaching a flex cell 108 to the support surface 104 is illustrated in FIG. 7. In this embodiment, the flex cell 108 is manufactured as part of the support surface 104. The support surface 104 includes an elevated portion 702 and a shell groove 706 defined between the elevated portion 702 and the support surface 104. A portion of the ribs 406 of the flex cell 108 are integrated and/or inserted into the shell groove 706. The elevated portion 702 prevents the portions of the ribs 406 that are in the shell groove 706 from being removed from the shell groove 706, so that the flex cell 108 is attached to the support surface 104.

Although two attachment mechanisms are shown in the embodiments illustrated in FIG. 6 and FIG. 7 it should be understood that in other embodiments, any other suitable method of attaching the flex cells 108 to the support surface 104 may be used. As an example, the flex cells 108 may be pivotally attached to the support surface 104 using a hinge mechanism, a ball and socket mechanism, rivets, screws, bolts, or any other mechanism that secures the flex cell 108 to the support surface. In some embodiments, the flex cells 108 are designed to be removed from or break away from the support surface 104 upon the application of a compressive force and/or a shearing force. In other embodiments, the flex cells 108 are designed to deform and remain attached to the support surface 104 upon the application of force to the helmet 100. In some instances, the flex cells 108 are able to return to an original position after deforming due to an application of force to the helmet 100.

In some embodiments, the flex cell 108 includes a sensor that is capable of measuring various properties of the flex cell 108. The sensor gathers information regarding properties such as acceleration and force applied to flex cell 108 and provides feedback to a user for monitoring or for further analysis. This information may be used for evaluation of a subject using the flex cell 108 and for future improvement of the function of the flex cell 108. Although acceleration and force are given as representative properties to be measured by the sensor, the sensor may have the capability to track and record other measurable properties as desired.

Figure 8:
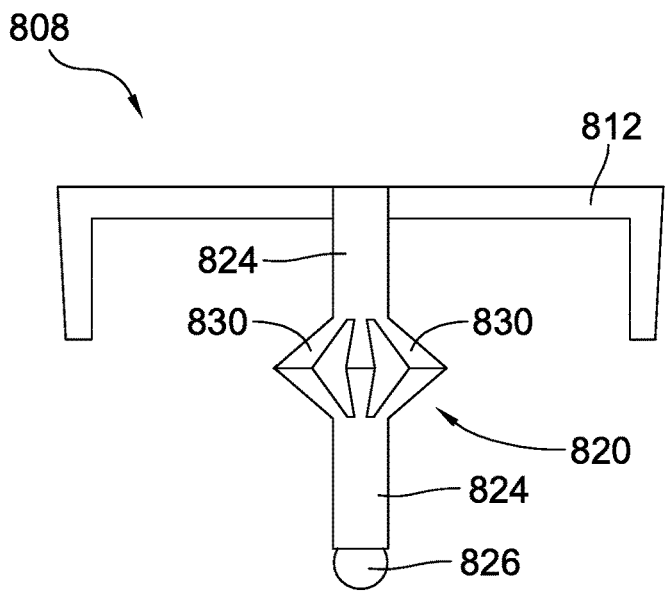
FIG. 8 is an alternative embodiment of a flex cell with ribs.

FIGS. 8, 9, 10, 11, and 12 illustrate alternative embodiments of flex cells. FIG. 8 shows a flex cell 808 that includes a panel 812 and a flex cage 820. A post 824 connects the flex cage 820 to the panel 812, and the post 824 extends from the flex cage 820 to a connection point 826 to connect the flex cell 808 to a support surface 104 or another object. The flex cage 820 includes ribs 830 that are built into the post 824. The ribs 830 extend from the post 824 and are hinged to form a V-shape, allowing the ribs 830 to be crushed between the post 824 when a compressive force and/or a shear force is applied to panel 812. In some instances, if sufficient force is applied, the ribs 830 may be broken at the hinge point. Energy is absorbed by the ribs 830, as the ribs 830 are deformed between the post 824, reducing the amount of energy transferred to the object to which the flex cell 808 is attached.

Figure 9:
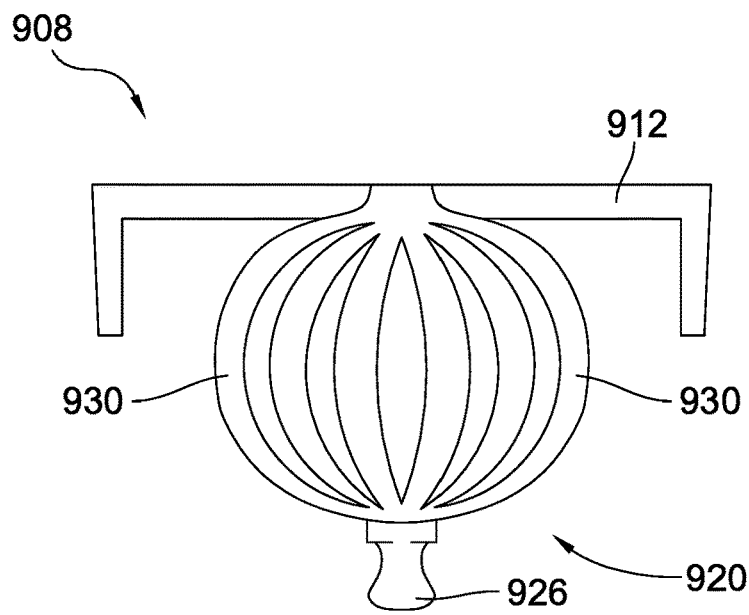
FIG. 9 is an alternative embodiment of a flex cell with a spherical flex cage with ribs.

FIG. 9 illustrates an embodiment of a flex cell 908 that includes a panel 912 and a flex cage 920. The flex cage 920 is attached between the panel 912 a connection point 926 for connecting the flex cell 908 to a support surface 104 or to another object. The flex cage 920 is formed from ribs 930 that are curved to form a spherical flex cage 920. The ribs 930 are formed from a resilient material that allows deformation of the ribs 930 to absorb energy when a compressive force and/or a shear force is applied to the panel 912.

Figure 10:
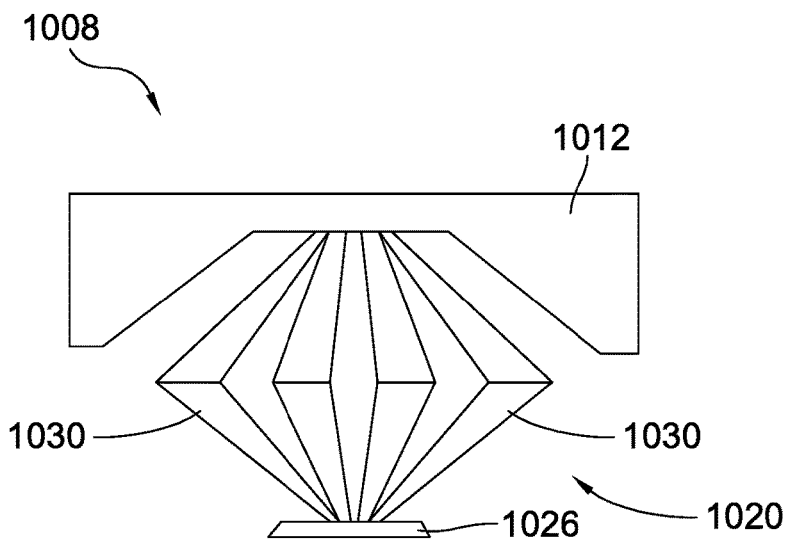
FIG. 10 is an alternative embodiment of a flex cell with ribs.

FIG. 10 shows an embodiment of a flex cell 1008 that includes a panel 1012 and a flex cage 1020. The flex cage 1020 is attached between the panel 1012 a connection point 1026 for connecting the flex cell 1008 to a support surface 104 or to another object. One end of the flex cage 1020 is attached directly to the panel 1012 while the other end of the flex cage 1020 is attached directly to the connection point 1026. The flex cage 1020 includes ribs 1030 that are hinged to form a V-shape. The ribs 1030 are able to deform or be crushed, and absorb energy, when a compressive force and/or a shear force is applied to panel 1012. In some instances, if sufficient force is applied, the ribs 1030 may be broken at the hinge point.

Figure 11:
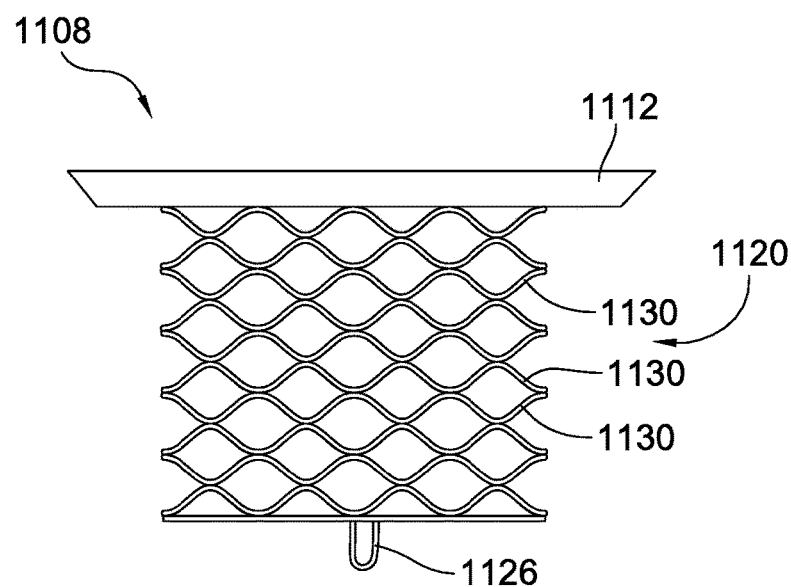
FIG. 11 is an alternative embodiment of a flex cell with a corrugated flex cage with ribs.

FIG. 11 shows an embodiment of a flex cell 1108 that includes a panel 1112 and a flex cage 1120. The flex cage 1120 is attached between the panel 1112 a connection point 1126 for connecting the flex cell 1108 to a support surface 104 or to another object. One end of the flex cage 1120 is attached directly to the panel 1112 while the other end of the flex cage 1120 is attached directly to the connection point 1126. The flex cage 1120 includes a series of corrugated ribs 1130. The corrugated ribs 1130 are designed to be crushed or deformed upon a compressive force and/or a shear force being applied to the panel 1112. Deformation of the corrugated ribs 1130 absorbs at least a portion of the energy from the applied force, preventing that absorbed energy from being transferred to the object to which the flex cell 1108 is attached.

Figure 12:
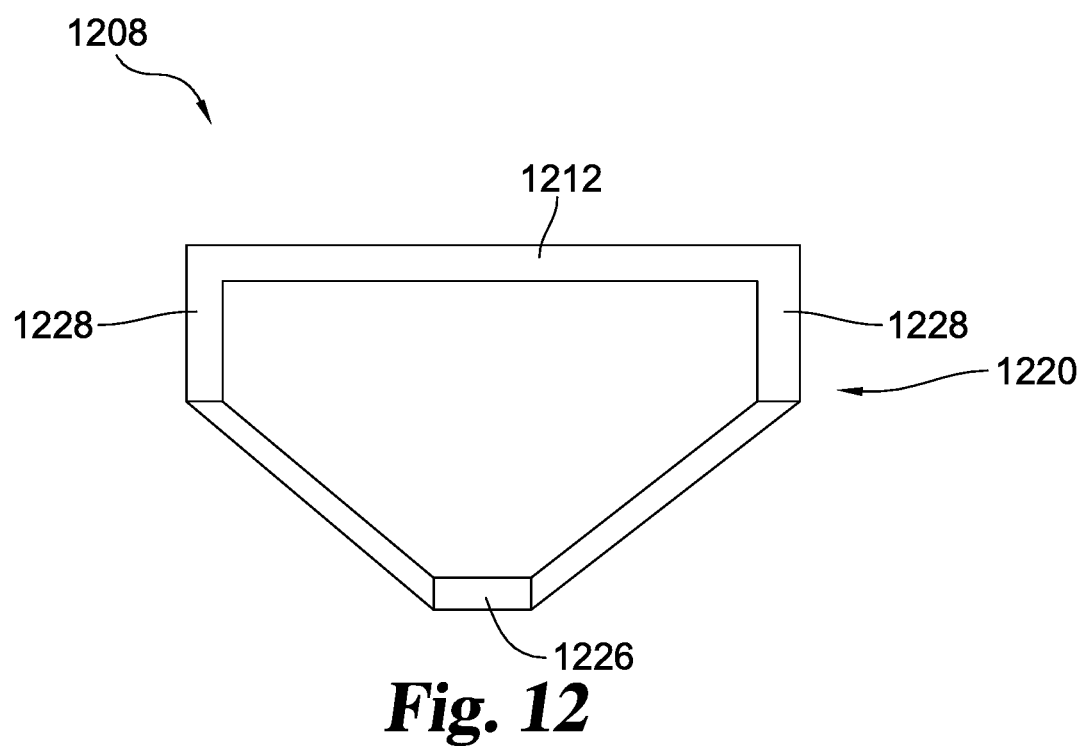
FIG. 12 is an alternative embodiment of a flex cell.

FIG. 12 illustrates an embodiment of a flex cell 1208 that includes a panel 1212 and a flex cage 1220 connected to the panel 1212. The flex cell 1208 is connectable to a support surface 104 or to the surface of another object at a connection point 1226. In some embodiments, the flex cell 1208 is connected to the support surface 104 using an adhesive so that the flex cell 1208 can break away from or unstick from the support surface 104 when force is applied to the flex cell 1208. The flex cell 1208 includes supports 1228 extending from each end of the panel 1212. The supports are attached to ribs 1230 that are angled between the supports 1228 and the connection point 1226. The ribs 1230 and/or the supports 1228 are made from a resilient material that allows the flex cage 1220 to deform upon application of a compressive force and/or a shear force to the flex cell 1208.

Figure 13:
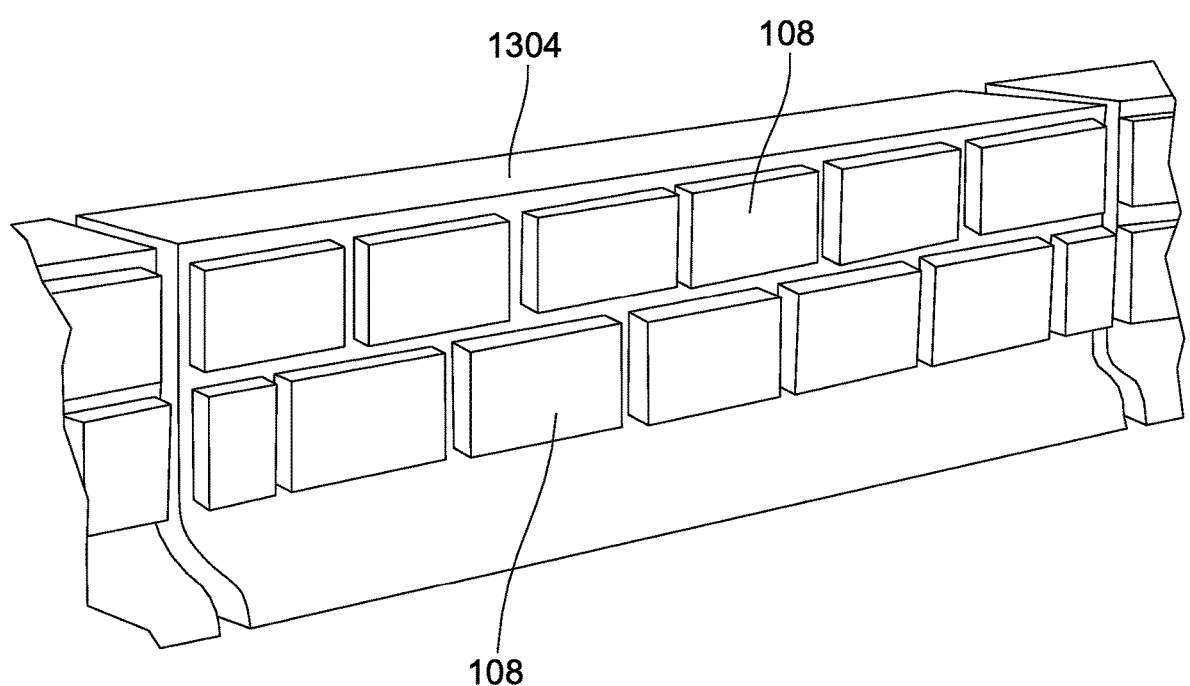
FIG. 13 is a perspective view of the flex cells of FIG. 3 attached to a safety barrier.
Figure 14:
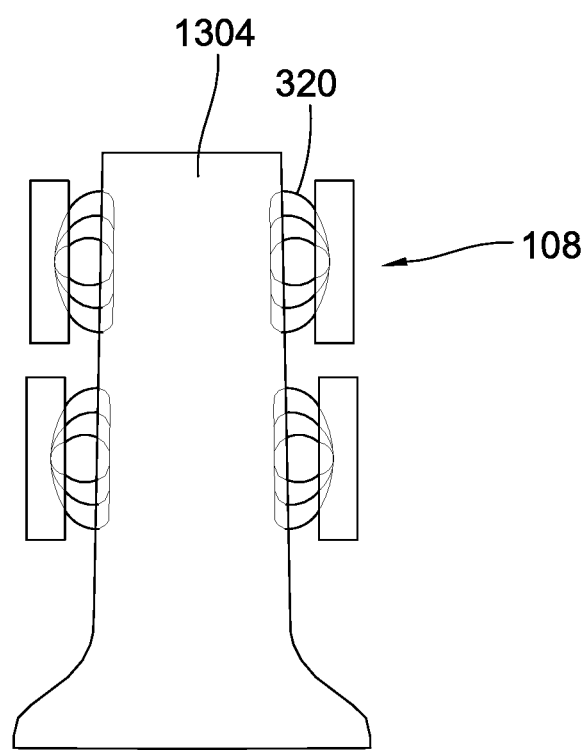
FIG. 14 is a side view of the safety barrier of FIG. 13.

Although the flex cells 108 are shown for use with a helmet, the flex cells 108 can also be used in other applications where dissipation of an impact force may be desired. The size and shape of the flex cells 108 may be varied to meet the needs and/or requirements of the application for which the flex cells 108 are used. In one example, shown in FIGS. 13 and 14, the flex cells 108 are applied to a traffic safety barrier 1304. The flex cages 320 of the flex cells 108 are attached to the surface of the traffic safety barrier 1304 and are capable of absorbing energy from an impact caused by a collision between a car and the traffic safety barrier 1304. Without the flex cells, the energy from the collision would typically be transferred directly from the safety barrier to the vehicle and the people inside the vehicle. Instead, kinetic energy is absorbed by the deformation of the flex cage 320 of the attached flex cells 108, decreasing the amount of energy transferred to the people inside the vehicle.

In some embodiments where flex cells 108 are used on traffic safety barriers, the panel 302 of the flex cell 108 may be made from cement or concrete while the flex cage 320 is formed from rebar. In other embodiments, the flex cell 108 may be made from aluminum while the panel 302 is made from concrete or the panel 302 is also made from aluminum.

In addition to traffic safety barriers, other examples of use for the flex cells 108 include race track barrier walls and guardrails. The flex cells 108 may also be used as protective wear in applications such as body armor, shields, sports padding, and shoe soles. Additional protective applications include cell phone cases and protection for shipping and packaging by attachment to boxes.

Figure 15:
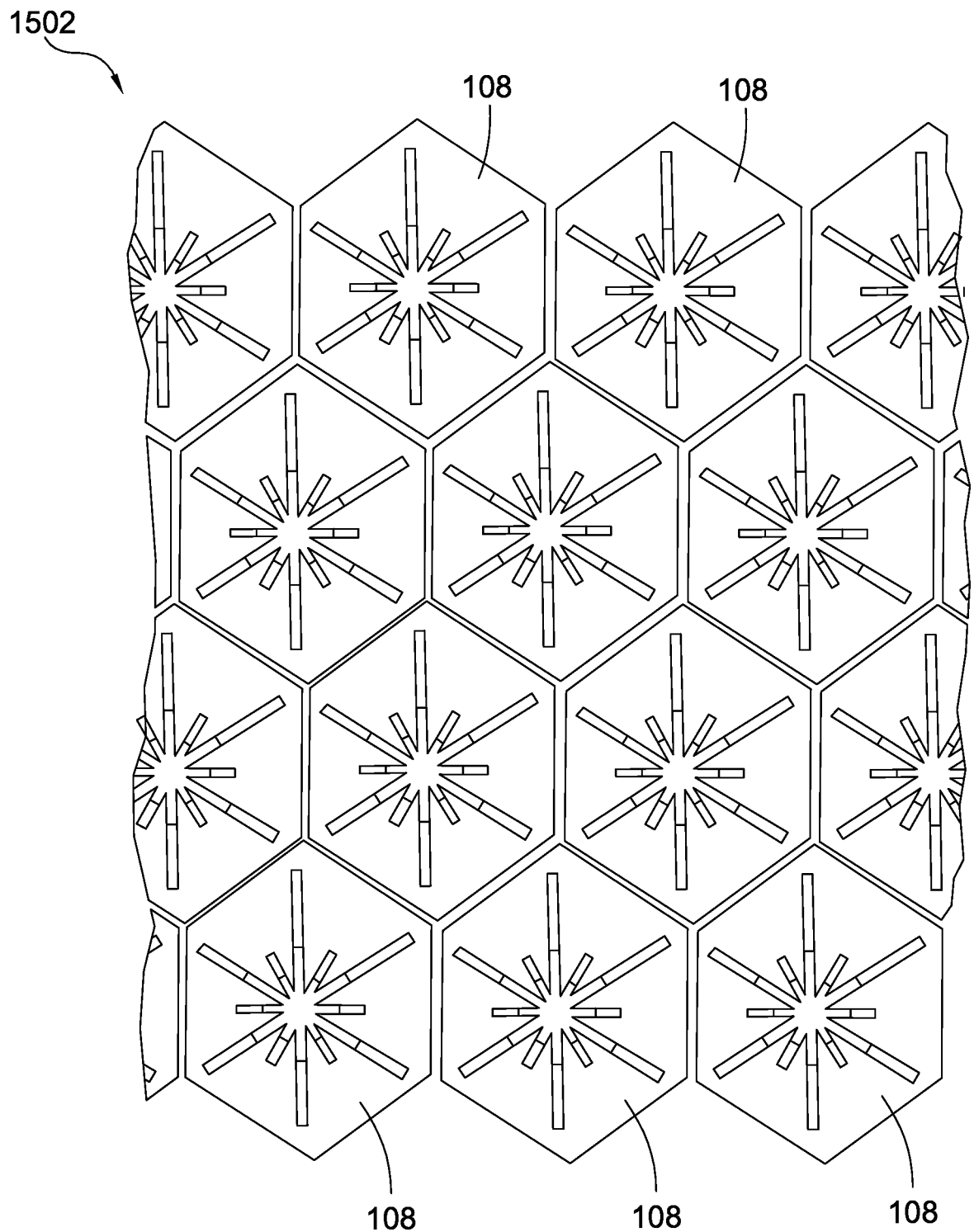
FIG. 15 is a top view of a sheet of the flex cells from FIG. 3.

In some applications, the flex cells 108 are arranged in a sheet or in strips to be applied to a desired surface as a group rather than individually. In the embodiment shown in FIG. 15, the flex cells 108 are hexagonal and fit together in a honeycomb pattern to form a sheet 1502. An adhesive may be applied to one side of the sheet 1502 of flex cells 108 so that the sheet 1502 may be applied to the surface of an object that is desired to be protected. The adhesive also allows the sheet 1502 to be applied to a surface retroactively, so that the flex cells 108 do not need to be manufactured with the object to be protected.

Although the sheet 1502 is shown as having four rows of flex cells 108, in other embodiments, the sheet 1502 may include fewer flex cells 108 or may include a greater number of flex cells 108. As an example, the sheet 1502 may include a single row of flex cells 108 or the sheet 1502 may include 10 rows of flex cells 108.

Additionally, the sheet 1502 may be formed from flex cells 108 of different shapes and/or sizes. For example, the flex cells 108 may be circular, rectangular, triangular, or any other desired shape. Also, flex cells 108 of different shapes and different shapes may be included on the same sheet 1502. In some embodiments, the flex cells 108 may be circular and include flex cells 108 of different diameters on the same sheet 1502. In other embodiments, a single sheet 1502 may include triangular flex cells 108 and rectangular cells 108, or any other desired combination of shapes and sizes of flex cells 108.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Flex cage" generally refers to any structure that is part of a flex cell that that is capable of deformation and absorption of energy upon the application of a force. The flex cage may have any structure and may be made of any material that allows for deformation. Flex cages may be designed to be attached to a panel and may be attached either permanently to the panel or removably attached to the panel.

"Resilient" generally refers to a property of materials that have the capability to deform, flex, recoil, or return to an original position without breaking after bending, stretching, or compressing.

"Support surface" generally refers to any type of surface on which another object may rest, be coupled to, be attached to, or come into contact with. A support surface may be flat or curved, may be the top, bottom, or any side of an object, or may be the ground.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An energy absorption system, comprising:
   a support surface;
   a first flex cell coupled to the support surface, wherein the first flex cell includes
   a panel,
   a flex cage attached to the panel, and
   wherein the flex cage is made from a resilient material that allows deformation of the flex cage when a force is applied to the first flex cell;
   wherein the case includes a plurality of ribs, the ribs connecting the panel to the support surface;
   wherein the ribs are configured to flex laterally and inwardly during an impact;
   wherein the panel is solely connected to the support surface via the ribs;
   a second flex cell attached to the support surface;
   wherein the second positioned adjacent to the first flex cell; and
   wherein the first flex cell is configured to flex laterally to impact the second flex cell to disperse energy.

2. The energy absorption system of claim 1, wherein the flex cage further includes,
   a panel rib locus and a support rib locus; and
   each of the ribs including a panel end and a support end, wherein the panel end of each rib is connected to the other ribs of the plurality ribs at the panel rib locus and the support end of each rib is connected to the other ribs of the plurality ribs at the support rib locus.

3. The energy absorption system of claim 2, wherein adjacent ribs of the plurality of ribs are of differing length.

4. The energy absorption system of claim 2, wherein the flex cage includes at least four ribs.

5. The energy absorption system of claim 1, wherein the first flex cell is separable from the support surface when a force exceeding a separation threshold is applied to the first flex cell.

6. The energy absorption system of claim 1, wherein the flex cage is dome shaped.

7. The energy absorption system of claim 1, wherein the first flex cell is attached to the support surface using an adhesive.

8. The energy absorption system of claim 1, wherein at least a portion of the flex cage is exterior of the panel.

9. The energy absorption system of claim 1, wherein the support surface is a helmet.

10. The energy absorption system of claim 1, wherein the support surface is a traffic safety barrier.

11. The energy absorption system of claim 1, further comprising:
    a flex cell attachment fitting defined in the first flex cell wherein the flex cell attachment fitting includes a notch;
    a support surface attachment fitting defined in the support surface, wherein said support surface attachment fitting includes a notched recess; and
    wherein the notched recess in the support surface attachment fitting is configured to receive the notch in the flex cell attachment fitting to attach the first flex cell to the support surface.

12. The energy absorption system of claim 11,
wherein the flex cell attachment fitting includes a leg;
wherein the support surface attachment fitting includes an undercut portion; and
wherein the undercut portion of the support surface attachment fitting is configured to receive the leg of the flex cell attachment fitting to attach the first flex cell to the support surface.

13. The energy absorption system of claim 1, further comprising:
a second flex cell coupled to the support surface adjacent to the first flex cell; and
wherein the second flex cell deforms independently of the first flex cell when a force is applied to the second flex cell.

14. An energy absorption system, comprising:
a panel;
a flex cage including
a panel rib locus and a support rib locus,
a plurality of curved ribs, each rib including a panel end and a support end, wherein the panel end of each rib is connected at the panel rib locus and the support end of each rib is connected at the support rib locus, and
wherein the plurality of ribs define a rib gap between adjacent ribs; and
wherein the panel is attached to the flex cage;
wherein the ribs are outwardly bowed; and
wherein the ribs are circumferentially arranged around the panel rib locus and the support rib locus.

15. The energy absorption system of claim 14, wherein each of the plurality of ribs comprises a resilient material configured to allow the ribs to deform upon application of a force on the panel and the flex cage.

16. The energy absorption system of claim 14, wherein adjacent ribs of the plurality of ribs are of differing length.

17. The energy absorption system of claim 14, wherein the flex cage includes at least four ribs.

18. The energy absorption system of claim 14, further comprising a sensor, wherein the sensor measures an amount of force applied to the panel.

19. The energy absorption system of claim 14, wherein a portion of each rib of the plurality of ribs is implanted into the panel and wherein a portion of each rib of plurality of ribs extends exterior to the panel.

20. The energy absorption system of claim 14, wherein:
the ribs comprises a resilient material configured to allow the ribs to deform upon application of a force on the panel and the flex cage;
the panel is solely connected to the support surface via the ribs; and
the panel has a distal face with a convex shape to redirect energy flow during the impact.

21. The energy absorption system of claim 14, wherein:
the ribs are configured to flex laterally and inwardly during an impact;
the panel is solely connected to the support surface via the ribs; and
the panel has a distal face with a convex shape to redirect energy flow during the impact.

22. The energy absorption system of claim 14, wherein:
the panel ends extend towards one another at the panel rib locus; and
the support ends extend towards one another at the support rib locus.

23. A method, comprising:
attaching a plurality of ribs made from a resilient material to form a flex cage, wherein each rib includes a panel end and a support end, wherein the panel end of each rib is connected to the plurality of ribs at a panel rib locus and the support end of each rib is connected to the plurality of ribs at a support rib locus;
attaching a panel to the flex cage to form a flex cell, wherein the panel covers at least a portion of the plurality of ribs; and
connecting the flex cell to a support surface so that the panel of the flex cell overlays at least a portion of the support surface.

24. The method of claim 23, wherein the panel is solely connected to the support surface via the ribs.

25. An energy absorption system, comprising:
a support surface;
a first flex cell coupled to the support surface, wherein the first flex cell includes
a panel,
a flex cage attached to the panel, and
wherein the flex cage is made from a resilient material that allows deformation of the flex cage when a force is applied to the first flex cell;
a flex cell attachment fitting defined in the first flex cell wherein the flex cell attachment fitting includes a notch;
a support surface attachment fitting defined in the support surface, wherein said support surface attachment fitting includes a notched recess; and
wherein the notched recess in the support surface attachment fitting is configured to receive the notch in the flex cell attachment fitting to attach the first flex cell to the support surface.

26. The energy absorption system of claim 25, wherein:
the flex cell attachment fitting includes a leg;
the support surface attachment fitting includes an undercut portion; and
the undercut portion of the support surface attachment fitting is configured to receive the leg of the flex cell attachment fitting to attach the first flex cell to the support surface.

27. The energy absorption system of claim 25, further comprising:
a second flex cell coupled to the support surface adjacent to the first flex cell; and
wherein the second flex cell deforms independently of the first flex cell when a force is applied to the second flex cell.

28. The energy absorption system of claim 25, wherein:
the flex cage includes a plurality of ribs, the ribs connecting the panel to the support surface; and
the ribs are configured to flex laterally and inwardly during an impact.

* * * * *

UNITED STATES PATENT AND TRADEMARK OFFICE
CERTIFICATE OF CORRECTION

PATENT NO. : 11,134,738 B2
APPLICATION NO. : 16/169450
DATED : October 5, 2021
INVENTOR(S) : Darin D. Grice Page 1 of 1

It is certified that error appears in the above-identified patent and that said Letters Patent is hereby corrected as shown below:

In the Claims

Column 10, Claim 1, Line 18, replace "case" with --flex cage--
Column 10, Claim 1, Line 25, replace "second positioned" with --second flex cell is positioned--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*